United States Patent [19]
Van Dalen

[11] Patent Number: 4,595,321
[45] Date of Patent: Jun. 17, 1986

[54] PLUG CUTTER

[76] Inventor: Leonard Van Dalen, 802 Olive St., Cherry Hill, N.J. 08002

[21] Appl. No.: 134,971

[22] Filed: Mar. 28, 1980

[51] Int. Cl.$^4$ .................................................. B23B 51/04
[52] U.S. Cl. ..................................................... 408/205
[58] Field of Search ................... 408/205, 68, 67, 703; 144/23

[56]     References Cited
         U.S. PATENT DOCUMENTS

| 676,720 | 6/1901 | Kollmyer | 408/205 |
| 2,027,139 | 1/1936 | Abramson et al. | 408/205 |
| 2,978,002 | 4/1961 | Ransom | 408/205 |
| 3,130,763 | 4/1964 | Schlosser et al. | 408/205 |

Primary Examiner—Leonidas Vlachos
Attorney, Agent, or Firm—Robert K. Youtie

[57]                ABSTRACT

A woodworking tool for cutting plugs including a generally cylindrical, hollow bit having its working end open and of a wall thickness tapering from the working end, the wall having a through opening on one side spaced from the working end and a longitudinal slot extending from the side opening and opening through the working end, with the working end configured to define a cutting edge and stop for depth of cut.

4 Claims, 4 Drawing Figures

PLUG CUTTER

BACKGROUND OF THE INVENTION

As is well-known to those versed in the woodworking arts, tools have been provided in the past for cutting wood plugs, as for insertion in countersunk screw holes, and the like. Prior plug cutters have not been entirely satisfactory, either for use in mass production of plugs as in a factory, or less rigorous use, as on the site by cabinet makers, wooden boat builders, and the like. In high production usage overheating of tools is a problem, as is removal and retrieval of cut plugs. In low volume plug cutting, as by a hand-held prime mover rather than with a drill press arrangement, an important problem is in ease of maintaining the tool against undesired lateral movement. The prior art devices have not been entirely satisfactory in these respects.

SUMMARY OF THE INVENTION

It is, therefore, an important object of the present invention to provide a plug cutter construction which minimizes frictional resistance and resultant heat, to permit of more rapid production through longer operating periods.

Another object of the present invention resides in the provision of a plug cutter construction which greatly improves the lateral stability of the tool in cutting engagement with a work piece, so as to resist skipping and gouging even with hand-held operation, such as by electric hand drills.

Still another object of the present invention resides in the provision of a plug cutter having the advantageous characteristics mentioned in the preceding paragraphs, which automatically ejects cut plugs, without requiring any additional procedure or manipulation, further permits of convenient collection of the plugs produced, to greatly enhance production speed.

It is still another object of the present invention to provide a plug cutter of the type described which is simple, durable and reliable in construction and operation throughout a long useful life, and which can be economically manufactured for sale at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
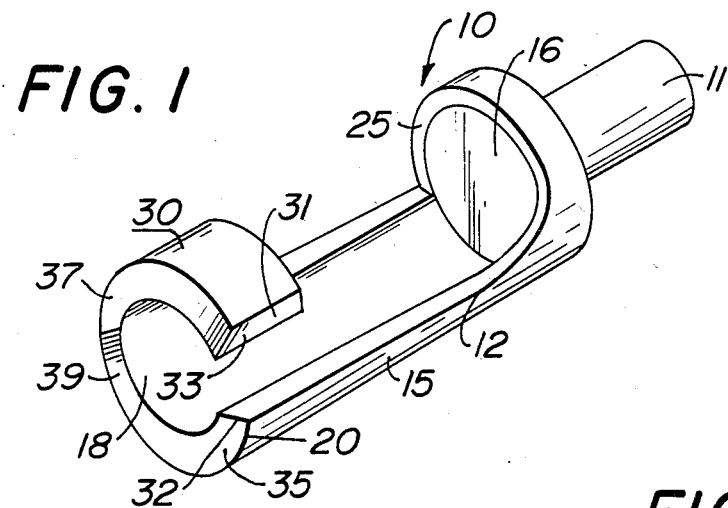
FIG. 1 is a perspective view showing a plug cutter constructed in accordance with the teachings of the present invention.
Figure 2:
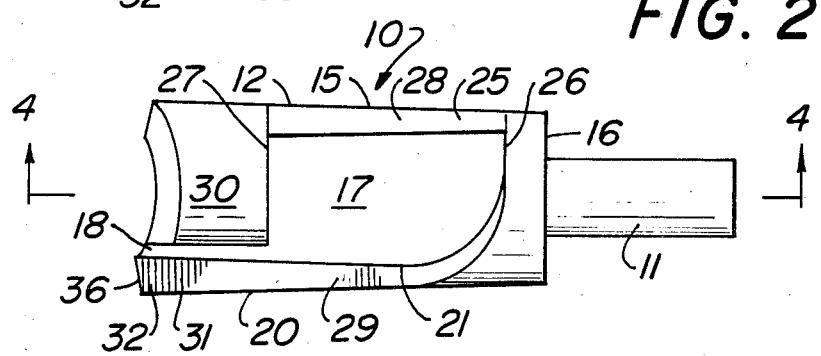
FIG. 2 is a top view of the plug cutter of FIG. 1.
Figure 3:
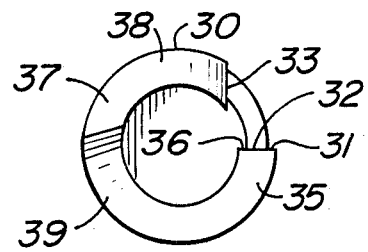
FIG. 3 is an end view showing the plug cutter of FIG. 1.
Figure 4:
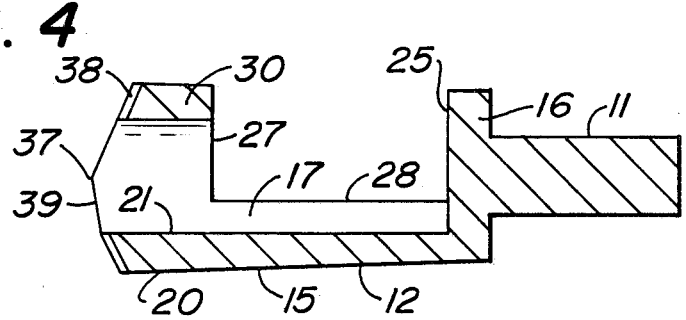
FIG. 4 is a longitudinal sectional view taken generally along the line 4—4 of FIG. 2.

Referring now more particularly to the drawings, and specifically to FIGS. 1 and 2 thereof, a plug cutter is there generally designated 10, and may include an elongate rod or shank 11 suitable for connection in a rotary chuck, or the like, say of an electric drill. Extending longitudinally from one end of the shank or stem 11 is a tool-working enlargement or bit, generally designated 12. The bit 12 is generally cylindrical and coaxial with the shank 11.

More specifically, the bit 12 includes a hollow, generally cylindrical wall 15, having one end closed, as by an end wall 16, which is secured fast to or integral with the shank 11, generally coaxially thereof.

The cylindrical wall 15 includes a hollow interior 17 of generally cylindrical configuration, and its distal end region remote from the shank 11 is open, as at 18.

The external surface 20 of the cylindrical wall 15 tapers longitudinally inwardly and coaxially, from the outer, distal or remote end region 18 to the inner end wall 16. This is best seen in FIG. 2, the outside diameter of the wall 15 reducing from the outer to the inner ends of the wall. Also seen in FIG. 2 is that the internal surface 21 of the cylindrical wall 15 tapers in the longitudinally outward direction, as from the inner end wall 16 to the remote end region 18. That is, the interior hollow 17 converges in the longitudinally outward direction as the inside diameter of the cylindrical wall 15 reduces, coaxially thereof, from the inner end wall 16 to the remote end region 18.

A side or plug outlet opening 25, of substantial proportions, defines a through hole in the cylindrical wall 15 between the interior 17 and the surrounding environs. More specifically, the side opening or outlet hole 25 is located spaced from the distal or remote end region 18 of the wall 15, having its inner end edge 26 approximate to the inner end wall 16 and its outer end edge 27 spaced inwardly from the remote end of the cylindrical wall. The opening 25 extends circumferentially of the cylindrical wall 15 at least through 180° thereof and is preferably of greater angular extent, say 240° between spaced sides or edges 28 and 29. This leaves an arcuate distal end segment 30 between the side opening 25 and remote end of the cylindrical wall 15.

A slot or cut 31 extends longitudinally through the wall segment 30, opening at opposite ends into the side opening or hole 25 and outwardly through the distal or remote end of the cylindrical wall 15. The slot 31 may have one side or edge 32 a flush extension of the opening edge 29, and the other side or edge 33 of slot 31 defines the end surface of segment 30. Thus, the wall segment 30 is an arcuate arm and the slot side 33 defines the end surface of the arm. Advantageously, the slot 31 is relatively narrow, being of an angular extent about 45° of the cylindrical wall 15, and not more than 50° thereof. By the relative narrowness of slot 31, the working remote end of cylindrical wall 15 has a greater continuous proportion, for a purpose appearing presently.

The end surface 35 at the distal or remote end of cylindrical wall 15 extends from an intersection with slot side 32 generally helically and longitudinally inwardly toward the opposite cylindrical wall end. Thus, the end surface region 35 intersecting with the slot side 32 at a meeting edge 36 defines an acute angle for cutting engagement with a work piece. By the helix angle of end surface region 35, the cutting edge 36 is relieved or provided with a clearance angle, as required for effective wood cutting. In addition, the end surface region 35 is bevelled or oblique, declining outwardly so as to form an acute angle with the internal cylindrical wall surface 21.

After the end surface region 35 affords sufficient relief or clearance, it may extend longitudinally outwardly, as by a smoothly merging end wall portion 39, which terminates in an outstanding projection or crest 37 spaced longitudinally inwardly of the cutting edge 36 by a distance controlling the depth of cut by the cutting edge. Further, from the projection or stop 37, the end surface region 38 may extend generally to the slot 31, terminating at an intersection with the free end 33 of the segment 30. The end wall region 38 extends helically or obliquely inwardly toward the slot 31 to afford clearance for chip breaking action of the cutting edge.

In operation, it will now be appreciated that the working end region 18 of the bit 12, as defined by the cutting edge 31 and end surface 35, 39, 37 and 38, is substantially a complete annulus, discontinuous only in the relatively small region of slot 31, so that the tool 10 may be relatively easily held against undesired lateral movement in operation, to effectively eliminate skipping and gouging. Further, the limitation of depth of cut, as by the longitudinal distance between cutting edge 36 and stop formation 37, also obviates a tendency to skip or gouge.

Wood chips or waste produced in the working operation are readily exhausted upwardly through the slot 31, the helical clearance angle of end region 38 being sufficient to prevent any binding or clogging of the chips. Upon cutting through a board, the plug produced will enter into the hollow 17, being effectively retained against movement through the open bit end by the internal convergence thereof. Upon cutting of the next plug, the first cut plug will automatically be elevated beyond the edge 27 of opening 25 for centrifugal discharge from the bit. This procedure is repeated indefinitely, and the discharged plugs may be conveniently collected by placing a circular or closed fence on the upper surface of the work piece to collect the cut plugs for periodical removal.

As the internal and external wall surfaces 21 and 20 are tapered, to afford internal and external clearance from the work, it will be understood that a minimum of friction and resultant heat are produced, for long continued and efficient operation. Dry lubricant consisting of molybhenum disulfide is aoplied to the surfaces, particularly for working hard woods and for operation at higher speeds with universally used ¼" hand electric drills. This penetrating coating will last for many years and has the lowest co-efficient of friction of any known material.

Also, as the cutting edge 36 is fully backed by the wall 15, remote from the segment 30 and side opening 25, it will be appreciated that maximum strength is applied at the cutting edge for more satisfactory cutting action.

From the foregoing, it is seen that the present invention provides a plug cutter which is extremely simple in construction, highly versatile in use, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A plug cutter comprising a shank for powered axial rotation, and a bit extending coaxially from said shank, said bit including a generally cylindrical wall having an open end remote from said shank, said wall tapering externally in the direction away from said remote end and tapering internally in the direction toward said remote end, said wall having a side opening spaced from said remote end and extending at least 180° about said wall, said wall having a longitudinally disposed through slot extending from said side opening and opening through said remote wall end, and an end surface on said remote wall end intersecting with a one side of said slot in an acute angle to define a cutting edge, said end surface being bevelled and extending entirely across the thickness of said wall, said end surface extending from said cutting edge sufficiently to afford relief and thence longitudinally outwardly to a predetermined longitudinal distance inwardly from said cutting edge, for depth control of cut.

2. A plug cutter according to claim 1, said remote wall end adjacent to the other side of said slot being cut away for clearance.

3. A plug cutter according to claim 1, said slot having one side flush with one side of said side opening for maximum strength in the region of said cutting edge.

4. A plug cutter according to claim 3, said slot being of constant cross-sectional configuration extending angularly of said cylindrical wall no more than 50°.

* * * * *